INVENTOR.
Lowell H. Morris

United States Patent Office 3,366,406
Patented Jan. 30, 1968

3,366,406
ADJUSTABLE TELESCOPIC BAR UNIT
Lowell H. Morris, Dixon, Calif., assignor to Morris Manufacturing Company, Dixon, Calif., a partnership
Filed May 1, 1967, Ser. No. 635,097
3 Claims. (Cl. 287—58)

ABSTRACT OF THE DISCLOSURE

A longitudinally adjustable bar unit comprising a pair of tubular, relatively slidable and rotatable members arranged in telescoping relation; the inner member having a projecting but depressible stop pin selectively engaged in holding relation in any one hole of a longitudinal row thereof in the outer member, and disengageable therefrom for extension or contraction of the bar unit upon manipulation of the members in a certain manner.

Background of the invention

Longitudinally adjustable telescopic bar units, comprised of relatively slidable telescopic members, have heretofore been normally but releasably held in a selected adjusted length by a projecting but depressible stop pin on the inner member engaged in a hole of a longitudinal row thereof in the outer member; this arrangement, however, having been disadvantageous in that the pin had to be manually depressed at each hole to permit the pin to move from hole to hole upon longitudinal adjustment of said bar unit.

Summary of the invention

This invention provides, as a major object, an adjustable telescopic bar unit, of the type described, adapted to serve as a leg, brace, or similar member in a portable tent frame or the like, and arranged in a manner such that upon longitudinal force being applied to the telescopic members to cause relative movement thereof in a direction to extend the length of the bar unit, the stop pin is automatically depressed and escapes the holes successively until adjustment of the bar unit is completed; the pin then re-engaging in holding relation in one of the holes.

This invention provides, as another object, an adjustable telescopic bar unit, as above, wherein the inner and outer telescopic members—upon relative part-circle rotation thereof when the stop pin occupies a depressed position between adjacent holes of the row thereof in the outer member—can then be freely relatively slid in a direction to decrease the length of the bar unit and without interference due to the pin tending to engage in any such hole.

The present invention provides, as a further object, an adjustable telescopic bar unit which is designed for ease and economy of manufacture, and convenience of use; such bar unit being adjustable, to increase or decrease its length, selectively, in a much easier fashion than heretofore with this general type of bar unit.

The present invention provides, as a still further object, a practical, reliable, and durable adjustable telescopic bar unit and one which is exceedingly effective for the purpose for which it is designed.

Description of the preferred embodiment

Figure 2:
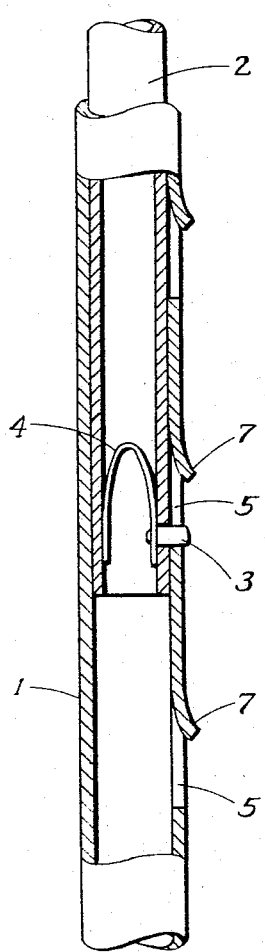
FIG. 2 is a fragmentary enlarged sectional elevation of the unit, taken on line 2—2 of FIG. 1.
Figure 3:
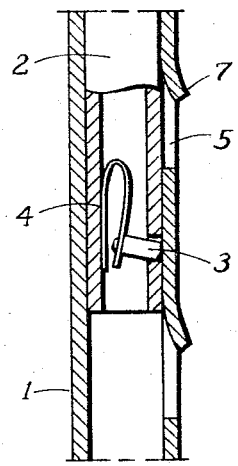
FIG. 3 is a similar view, but showing the telescopic members as relatively rotated to place the stop pin out of line relative to the pin-receiving holes.

Referring now more particularly to the drawings and to the characters of reference marked thereon, the bar unit comprises an outer tubular member 1 and an inner member 2, both circular in cross section; the inner member 2 slidably and turnably projecting into the member 1. The members 1 and 2 are of rigid form and at their opposite ends are provided with suitable fittings (not shown) for engagement with elements between which the bar unit extends, and which form no part of this invention.

The inner tubular member 2 is provided, adjacent the inner end thereof, with a radial stop pin 3 supported by and connected at its inner end to a suitable spring 4 inside said member 2, and which spring yieldably urges the pin outwardly through a hole as shown.

Figure 1:
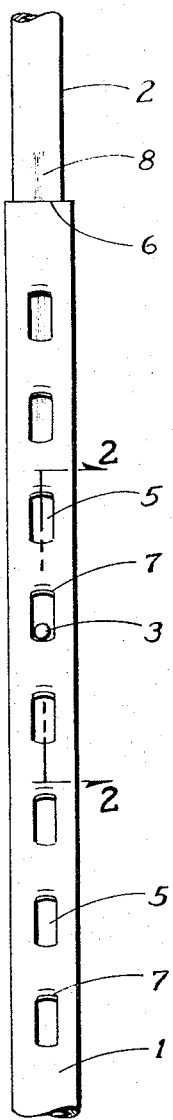
FIG. 1 is a fragmentary longitudinal elevation of the adjustable bar unit, as partially telescoped.

The outer tubular member 1 is formed with a longitudinally extending row of spaced holes 5; the row starting adjacent the end 6 of said member 1 into which the member 2 projects, as shown in FIG. 1. Each hole 5 is of substantially rectangular and somewhat elongated form lengthwise of the member 1; the width of the holes being somewhat greater than the diameter of the pin 3 so as to freely receive the latter therein. The length of the stop pin 3 is such that when yieldably urged outwardly by the spring 4, the outer or free end of such pin is disposed slightly outwardly of the periphery of member 2 and normally seats in the bottom of one of the holes 5, as shown in FIG. 2, to hold the bar unit against accidental contraction from a selected adjusted length.

The end of each hole 5 which corresponds to the end 6 of the member 1 is deformed outwardly to form an angular or sloping pin-depressing cam lip 7; the inclined or sloping underface of such lip being disposed for engagement by the outer and rounded end of the stop pin 3. Upon longitudinal force being exerted manually on the telescopic members 1 and 2 to cause relative movement thereof in a direction to extend or elongate the bar unit, the stop pin 3 will be automatically depressed as it engages and moves under each cam lip 7 and then becomes flush with the under surface of the member 1 immediately beyond the related hole 5. The stop pin 3 is thus recurringly depressed and moves from one hole to the next—without said pin having to be manually engaged—upon the bar unit being adjusted to extend its length. When such adjustment is completed, the stop pin 3 snaps outwardly in holding relation into an adjacent hole 5; the pin seating in the bottom of such hole when the bar unit is placed under compression.

To contract the bar unit from such an adjusted length, it is only necessary to relatively part-circle rotate the members 1 and 2 when the pin 3 is in a depressed position between adjacent holes 5, and to then push the members together after such part-circle rotation has disposed the pin to one side or the other of the row of said holes. Here again, the operation is conducted without manual touching of the stop pin.

When the bar unit has been thus contracted to the desired extent, the members 1 and 2 are again relatively part-circle rotated in the opposite direction to enable the holding pin 3 to snap into an adjacent hole 5 or to remain depressd beyond the inner end of the row of said holes.

To aid the operator in determining the position of the pin when it is out of sight and not in any hole, the member 2 is provided with a longitudinal distinctively colored line 8, which is alined with the pin, and a portion of which line will be exposed in one or another of the holes, as indicated in FIG. 1.

From the foregoing description, it will be readily seen that there has been produced such an adjustable telescopic bar unit as substantially fulfills the objects of the invention, as set forth herein.

While this specification sets forth in detail the present and preferred construction of the adjustable telescopic bar unit, still in practice such deviations from such detail may be resorted to as do not form a departure from the spirit of the invention, as defined by the appended claims.

I claim:

1. A telescopic bar unit comprising an outer tubular member, an inner member slidable in the outer member, a depressible stop pin spring-mounted in the inner member and normally projecting therefrom, there being a longitudinal hole in the outer member receiving such pin, the outer end of the latter then being disposed beyond the outer surface of the outer member, and an elongated cam lip pressed outwardly from the metal of the outer member and overhanging one end portion of the hole, and said cam lip extending from the end of the hole which is adjacent that end of the outer member into which the inner member projects; the under surface of the cam lip sloping at a relatively small acute angle lengthwise of the outer member from the inner surface thereof to an outer end termination in a plane to cammingly engage over the outer end of the projecting pin in pin-depressing relation upon relative longitudinal separating movement of the members.

2. A bar unit, as in claim 1, in which said under surface of the cam unit is formed from end to end with a longitudinal convex curvature.

3. A bar unit, as in claim 1, in which the members are turnable relative to each other, and the inner member is provided with a distinctive longitudinal line marked thereon in alinement with the pin and projecting therefrom in a direction opposite that toward which the inner member moves toward a contracted position.

References Cited

UNITED STATES PATENTS

| | | | |
|---|---|---|---|
| 905,828 | 12/1908 | Akers | 285—319 |
| 2,243,190 | 5/1941 | Capaldo. | |
| 2,594,605 | 4/1952 | Zoppelt. | |
| 2,932,047 | 4/1960 | Johnston. | |
| 3,239,255 | 3/1966 | Murcott. | |

FOREIGN PATENTS 424,060   1/1926   Germany.

EDWARD C. ALLEN, *Primary Examiner.*

W. L. SHEDD, *Assistant Examiner.*